April 23, 1968

H. DUPUIS 3,378,901

MILLING CUTTER

Filed Oct. 21, 1965

INVENTOR.
HUBERT DUPUIS
BY *Whittemore*
*Hulbert & Belknap*
ATTORNEYS

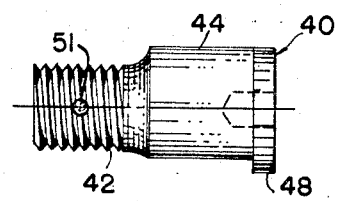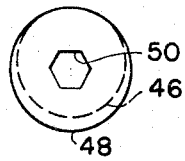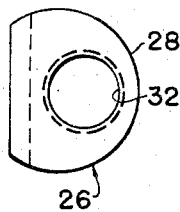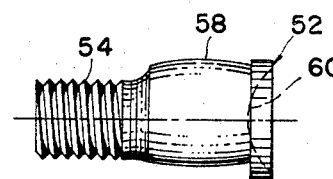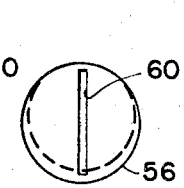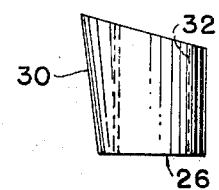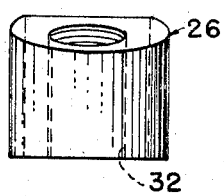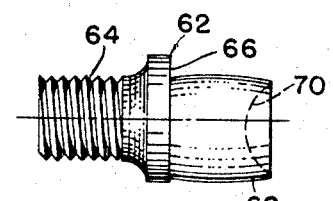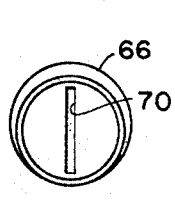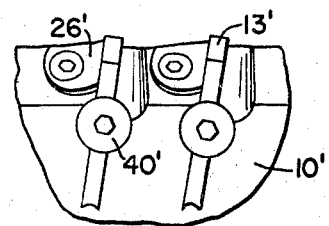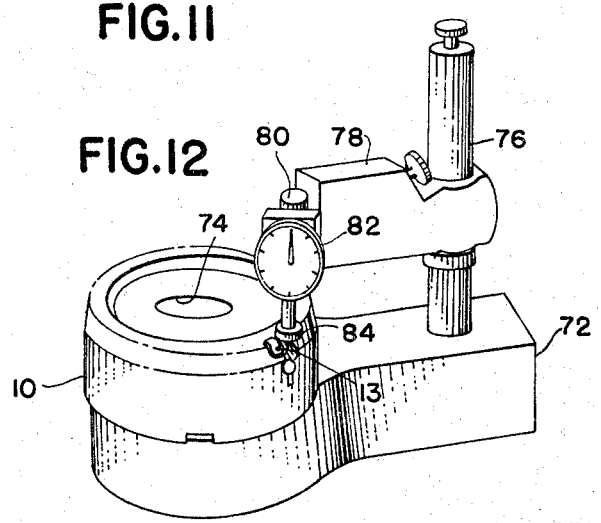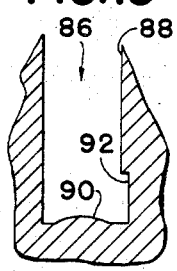
INVENTOR.
HUBERT DUPUIS
ATTORNEYS United States Patent Office 3,378,901
Patented Apr. 23, 1968

3,378,901
MILLING CUTTER
Hubert Dupuis, Warren, Mich., assignor to Goddard & Goddard Company, Detroit, Mich., a corporation of Michigan
Filed Oct. 21, 1965, Ser. No. 499,816
5 Claims. (Cl. 29—105)

ABSTRACT OF THE DISCLOSURE

A milling cutter having slots for receiving indexable inserts, and eccentric abutment elements extending into the slots and rotatable to provide adjustable abutments for predetermining the position of the inserts.

---

The present invention relates to a milling cutter.

It is an object of the present invention to provide a milling cutter employing indexable inserts together with improved means for locating and clamping such inserts.

More specifically, it is an object of the present invention to provide a milling cutter having slots in which indexable inserts are received, and adjustable abutments in said slots to position said inserts therein.

It is a further object of the present invention to provide a milling cutter as described in the preceding paragraph, in which the adjustable abutments are eccentric portions of threaded elements extending within the slots, preferably of barrel shape, and friction means for permitting rotation of the threaded elements by the operator while being effective to prevent rotation thereof except by manipulation of an operator.

It is a further object of the present invention to provide a milling cutter of the character described comprising a slot for the reception of an indexable insert, an inclined socket intersecting the side of said slot, an elongated clamp or wedge slidable longitudinally in said sockets, a threaded passage through said wedge, a tapped recess in the bottom of said socket, the threads of said tapped recess and said threaded passage being of opposite hand, and a clamping screw having threaded portions of opposite hand engageable respectively in said recess and said passage.

Other objects and features of the invention will become apparent as the description proceeds, especially when taken in conjunction with the accompanying drawings, illustrating a preferred embodiment of the invention, wherein:

FIGURE 2A is a fragmentary view illustrating a cutter having positive rake cutting elements.

FIGURE 3 is a side elevational view on an enlarged scale of a clamp used in the milling cutter.

FIGURE 4 is a front elevation of the clamp shown in FIGURE 3.

FIGURE 5 is a plan view of the clamp shown in FIGURE 3.

FIGURE 6 is an enlarged side elevational view of an adjustable abutment employed in the milling cutter.

FIGURE 7 is an end view ofthe abutment shown in FIGURE 6.

FIGURE 8 is an enlarged side elevational view of a modified form of adjustable abutment.

FIGURE 9 is an end view of the abutment shown in FIGURE 8.

FIGURE 10 is an enlarged side elevational view of still another modification of the adjustable abutment.

FIGURE 11 is an end view of the abutment shown in FIGURE 10.

FIGURE 12 is an elevational view of checking apparatus used for checking adjustment of the indexable inserts.

FIGURE 13 is an enlarged fragmentary sectional view illustrating the formation of the bottom of the insert receiving slot.

Figure 1:
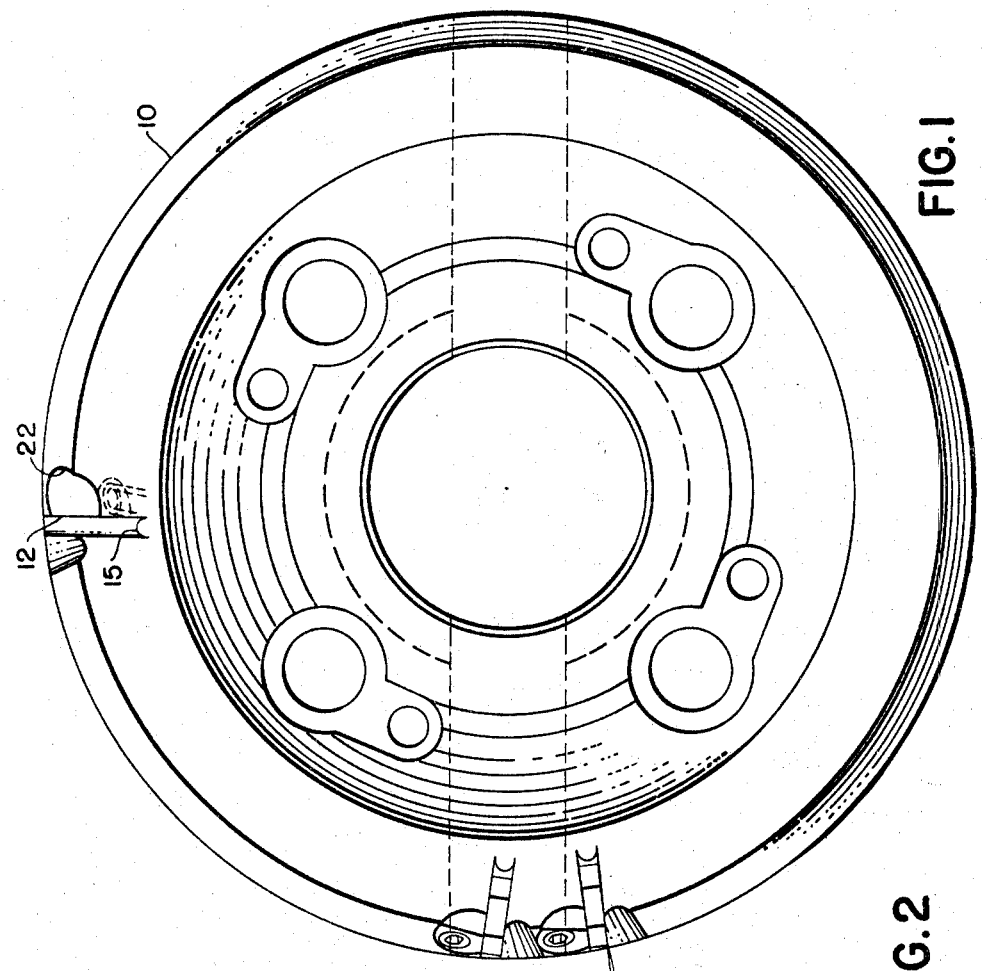
FIGURE 1 is a plan view of a face milling cutter constructed in accordance with the present invention.

The milling cutter disclosed herein is of the type known as a face mill and comprises a generally annular body 10 having a multiplicity of slots 12, each of which is adapted to receive an indexable insert 13 herein illustrated as of flat sided hexagonal form, the slots 12 extending inwardly from the lower corner between the circumferential or edge surface 14 and the flat bottom surface 16. The bottom or seating surfaces 15 of the slots 12 are convex so as to afford simple line contact with one edge surface of an indexable insert 13.

Figure 2:
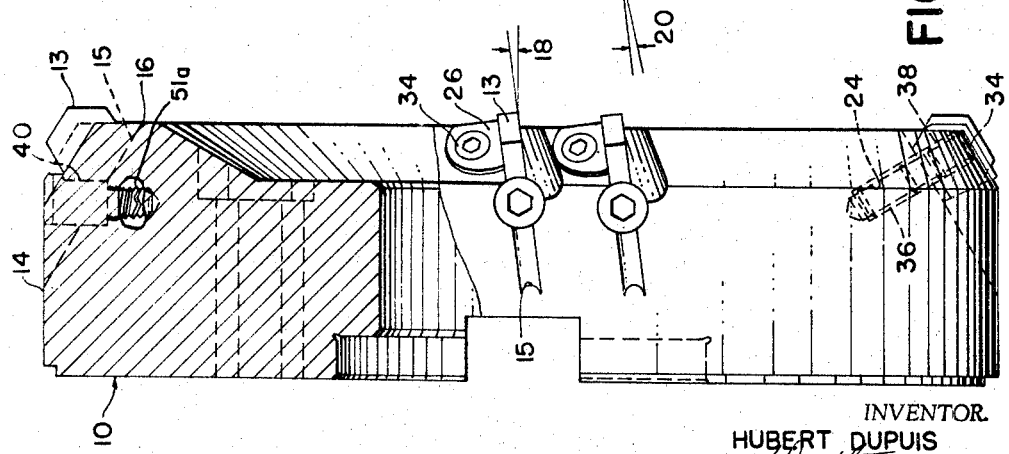
FIGURE 2 is a side elevation of the milling cutter with parts in section.

The slots 12 may be inclined as required to provide the desired cutting action. In the illustrated embodiment of the invention, as is apparent from FIGURE 2, the insert 13 forms a negative axial rake angle 18, and as best seen in FIGURE 1, the slots are given a compound inclination to provide a negative radial rake as indicated by the angle 20. In FIGURE 2A the slots are inclined to provide positive rake as shown.

Adjacent one side of each of the slots 12 is provided a socket 22 which is inclined to the slot 12 at a suitable angle, as for example approximately 8°30'. With this angle it will be observed that a wedging element slidable in the socket is close to a seizing taper rather than the customary large angle of inclination which has been used in the past. The socket 22 at its bottom is provided with a reduced threaded recess 24.

When one of the hexagonal flat sided indexable inserts 13 is inserted in a slot 12 it may be clamped in position therein by a wedge 26, details of which are best seen in FIGURES 3 and 4. Each of the wedges 26 has a cylindrically formed surface 28 which extends for substantially more than 180° and is interrupted by a flat surface 30 inclined at the same angle with respect to the longitudinal axis of the wedge as the angle of inclination of the socket 22 with respect to the slot 12. Accordingly, the flat side 30 of the wedge is adapted to engage in surface to surface contact with a flat side of an indexable insert 13. Moreover, each of the wedges 26 is provided with a threaded passage 32, the hand of the threads in the passage 32 being opposite to the hand of the threads in the recess 24.

Extending through the threaded passage through the wedge 26 and in threaded engagement with the tapped recess at the bottom of the socket 22 is a screw 34 having an inner end portion 36 of the same hand as the threads in the tapped recess and having an outer threaded portion 38 of the same hand as the threads in the pasage 32. With this arrangement rotation of the screw 34 in one direction causes the screw to move outwardly of the tapped recess and causes the wedge 26 to move outwardly with respect to the screw. This of course results in positive outward movement of the wedge when it is to be withdrawn and permits the wedge to be provided at an angle close to the seizing angle. The cylindrically formed portion of the side surface of the wedge permits the wedge to rotate in the socket as required to position its flat surface 30 in full surface to surface contact with a flat side of an insert 13. The engagement between the flat surface 30 of the wedge and the flat side of the insert 13 of course prevents rotation of the wedge as the screw 34 is advanced or retracted.

In order to position the indexable inserts 13 in proper position an adjustable locating abutment 40 is provided, details of which are best illustrated in FIGURES 6 and 7.

The adjustable abutments comprise a threaded shank 42 and an eccentric body portion 44, the eccentricity of which is best indicated by the dotted line 46 in FIGURE 7. The outer end of the abutment includes a flange portion 48 concentric with the axis of the threaded shank 42. A hexagonal recess 50 is provided in the end of the abutment 40 for rotating it with a suitable tool.

Means are provided for frictionally resisting rotation of the threaded shank of the abutment in a threaded recess. Any suitable means for this purpose may be provided such for example as friction material 51, which may be nylon, located in the threaded shank as seen in FIGURE 6 or in the threaded socket. However, in accordance with the present invention, use is made of a thread insert sold under the trade name "Helicoil." This thread insert indicated diagrammatically at 51a in FIGURE 2, is formed of resilient wire and is first threaded into the tapped recess to full depth where it remains permanently in position unless removed by a special tool. The threads of the shank 42 of the adjustable abutment are designed to cooperate with the convolutions of the thread insert. One such convolution is noncircular and is adapted to provide a uniform resistance to rotation of the adjustable abutment.

The purpose of the foregoing arrangement is to provide a means by which the eccentric abutment portion may be rotated into the required position by simple rotation of the element 40 and will remain in such position without requiring any separate means for locking or clamping it in position. Moreover, the arrangement provides for rotation of the abutment in a smooth manner since no excess force is required to break the abutment element free, resulting from over adjustment and the necessity for a back and forth adjustment into required position.

It will of course be apparent from the drawings that the eccentric portion of the abutment extends in position to contact one side of the indexable insert, and in conjunction with the bottom surface of the slot which is indicated at 15, affords positive location of the insert in its own plane. Full location of the insert is of course then provided by engagement between the flat side of the insert and the slot 12 and the other flat side of the insert and the flat surface 30 of the wedge 26.

In FIGURES 8 and 9 there is illustrated a modified adjustable abutment 52 comprising a threaded portion 54 and a cylindrical piloting portion 56 which is concentric with the threaded portion 54. Intermediate the portions 54 and 56 is a generally barrel shaped camming section 58 which is eccentric with respect to the axis esthablished by the threaded portion 54 and the piloting portion 56. A slot 60 is provided at the end for effecting rotation of the adjustable abutment 52.

Since the camming portion 58 is barrel shaped it will of course have theoretical point contact with a flat edge of a polygonal cutting insert and this point of contact will be located intermediate the ends and intermediate the sides of the edge. Thus, any slight error in angularity of the cutting insert will not appreciably affect the accuracy of its location and particularly, will not shift the engagement between the camming portion of the adjustable abutment and the insert to an end of the edge thereof.

Referring now to FIGURES 10 and 11 there is illustrated a substantially similar adjustable abutment 62 having a threaded portion 64, a piloting portion 66 concentric with the threaded portion, and a generally barrel shaped camming portion 68 which is eccentric with respect to the threaded portion 64 and the piloting portion 66. Again, a recess 70 is provided for effecting rotation of the adjustable abutment. It will be appreciated that the difference between the abutments 52 and 62 is essentially that in the former case the barrel shaped camming portion 58 is intermediate the threaded section and the piloting section, whereas in the latter case, the piloting section is intermediate the threaded portion and the eccentric camming portion.

In a cutter of this type it is of course essential that all of the inserts 13 be adjusted into exact position so that all may perform an equal cutting action.

Referring now to FIGURE 12 there is shown a checking fixture comprising a base 72 having a vetrical post extending into the central opening 74 of the cutter body 10. The post supports the cutter for accurate rotation about its own axis. Associated with the base 72 is a second post 76 on which is vertically adjustable an arm 78 which can be swung about the axis of the post 76 into and out of checking position and also to accommodate cutters of widely different diameters. Located on the arm 78 and connected thereto for angular adjustment about a pivot mounting 80 is an indicator 82 having a plunger 84 engageable with the outermost surface of an indexable insert 13.

In order to properly adjust all of the inserts in the cutter body 10 into corresponding positions, the inserts are positioned in the slots 12 with the wedges 26 retracted sufficiently to permit movement of the inserts 13 therein. A special tool having an end portion adapted to fit the recess in the abutment is provided. The cutter body 10 is rotated to bring an insert under the plunger 84 of the indicator and the reading is noted. If it differs from the reading of the previously adjusted insert the tool is rotated in the proper direction to rotate the eccentric portion of the abutment to produce inward or outward adjustment of the insert. The adjustment of the abutment requires only one hand of the operator leaving the other hand free to guide the indicator and to insure proper location of the plunger 84 with an insert as well as to effect indexed rotation of the cutter body 10 between successive adjusting operations.

A principal advantage of the checking fixture shown in FIGURE 12 is that it provides for effecting the necessary adjustment of the inserts as checking proceeds. The indicator arm 78 is swung over the inserts for inspection and if an adjustment is necessary it is swung out of the way to provide room for the operator to adjust the insert. Thereafter, the arm is swung back to position the indicator over the insert and its new position is checked with no loss of accuracy.

This operation is thus readily carried out without requiring either back and forth adjustment of the abutment, as might be the case if substantial static friction were required to be overcome to break the abutment element free for movement; or without requiring the provision of additional clamp means to clamp the abutment in adjusted position after it has been adjusted.

After the indexable inserts have been adjusted into exact position they may be clamped in such position by forcing the wedges 26 into clamping relation. This is accomplished without disturbing the exact location which has been given to the inserts as described in the foregoing.

It may be noted that after the wedges 26 have been suitably tightened, the indexable inserts are firmly held without danger of displacement even if the abutment elements were withdrawn. However, in operation the abutment elements remain exactly in the preset adjusted position to which they are moved and afford additional support to the indexable inserts if such is required.

With the foregoing description of a preferred embodiment of the invention in mind, some of the particular advantages will be pointed out. In the first place, the design permits selection of blade angle, either double positive, positive negative, or double negative. The particular design disclosed renders the adjustments to a few tenths of thousandths of an inch in the easiest and simplest manner possible.

The cutter is characterized by a minimum number of parts, only three parts being required per slot (less insert). These are of course the wedge, the wedge operating screw, and the abutment.

The provision of the straight transversely convex insert seating surfaces 15 is advantageous in that it provides line contact on an edge remote from the cutting edge, allows full indexing of inserts to the original setting, avoiding tip build up and wear which cause faulty seating, and accepts positive rake inserts of 10 to 16 degrees in the same cutter.

Referring now to FIGURE 13 there is illustrated on an enlarged scale the formation of the bottom of the insert receiving slot. In this figure the slot is designated 86 and has a flat side wall 88 against which one side of the cutting insert is pressed by the wedge 26. The bottom of the slot 86 is provided with a cylindrically shaped convex rib 90 and at the intersection between the bottom of the slot 86 and the side wall 88 the wall is undercut as indicated at 92. This undercut need be only a few thousandths of an inch deep and is for the purpose of protecting the cutting edge provided on the cutting insert against damage. In some cases the cutting edge may have picked up metal or may otherwise project slightly beyond the flat side of the cutting insert. The undercut recess 92 provides a space for receiving this cutting edge. Also, the provision of the undercut recess at this point assists in preventing fracture of the cutting insert in the event that the side surface thereof is not perfectly flat.

The provision of the wedge with a cylindrical surface for positive self location together with the double thread screw which effects positive movement of the wedge both into and out of wedging relation is a particular advantage. This arrangement permits the use of a small angle between the wedge socket and the adjacent surface of the indexable insert, as for example 8°30′. This is close to a seizing taper rather than the 14 or 15 degrees' angle which has been customary in prior cutters. Rotation of the wedge as a result of its cylindrical surface assures maximum holding power and face contact with the insert regardless of cutter body distortion.

The wedges employed in the present cutter may be used in fine pitch cutters (three or more blades per inch of diameter) as well as coarse pitch cutters. Furthermore, wedges for right hand and left hand cutters are very similar and require only minor differences in production. Also, it will be observed that wedges for positive rake cutters and negative rake cutters are generally interchangeable and usually all permit the use of the relatively large wedge actuating lock screw.

The provision of the wedge behind the insert assures positive insert location, regardless of variation in insert thickness. It also prevents cutter body damage in case of breakage.

The present design results in stronger cutter bodies than usual in cutters of this general type, particularly in fine pitch cutters, due to the relatively small radius of the wedge sockets which in practice have radii which may range from ¼ to 5/16 inch, and in the relatively narrow insert slot which in practice may be only 3/16 of an inch wide.

The provision of the eccentric abutment is of particular advantage since it, in combination with the convex surface 15 of the insert slot, provides full location of each insert by line contact along the two adjacent inner edges thereof. Moreover, the adjustment of the eccentric abutment, provided as it is with controlled friction means, permits smooth adjustment of the indexable insert into exactly gauged position and retention of the insert in such position without the necessity of manipulating additional locking means associated with the abutment.

The present cutter is designed for efficient use of indexable inserts of standard tolerance which is ±.005″ in thickness and ±.001″ in inscribed circle.

The present cutter will accept preformed chip breaker inserts with or without a central hole. These inserts are unground but on the present cutter may easily be set up to run within .0002″.

The drawings and the foregoing specification constitute a description of the improved milling cutter in such full, clear, concise and exact terms as to enable any person skilled in the art to practice the invention, the scope of which is indicated by the appended claims.

What I claim as my invention is:

1. A milling cutter comprising a circular body having a plurality of peripheral slots therein inclined with respect to the axis of said body for receiving indexable flat inserts therein, said slots having flat side walls engageable with flat sides of cutting inserts to locate each of said inserts in a plane parallel to its flat sides, said slots having bottom walls engageable with edges of cutting inserts to effect partial location of the inserts in said plane, adjustable abutment elements intersecting the slots at an angle to the bottom walls thereof to engage other edges of said cutting inserts to complete location of the inserts in said planes, means for clamping said inserts against the said flat side walls of said slots, said abutment elements being rotatable and having eccentric abutment surfaces extending into said slots.

2. A cutter as defined in claim 1 in which said abutment surfaces are cylindrical.

3. A cutter as defined in claim 1 in which said abutment surfaces are barrel-shaped.

4. A cutter as defined in claim 1 in which said body has threaded sockets adjacent each of said slots, said abutment elements having threaded end portions received in threaded sockets in said body, and friction means cooperating with the threaded end portions and sockets to retain said elements in adjusted position.

5. A cutter as defined in claim 4, said abutment elements having cylindrical piloting portions thereon concentric with said threaded end portions, said body having corresponding cylindrically formed recesses adjacent the threaded sockets for cooperation with said piloting portions.

References Cited

UNITED STATES PATENTS

| | | | |
|---|---|---|---|
| 2,684,520 | 7/1954 | Severson | 29—105 |
| 2,712,686 | 7/1955 | Heldt | 29—105 |
| 2,805,469 | 9/1957 | Greenleaf | 29—105 |
| 3,104,453 | 9/1963 | Greenleaf | 29—105 |
| 3,188,718 | 6/1965 | Wezel | 29—105 |
| 3,200,474 | 8/1965 | Kralowetz | 29—105 |
| 3,273,222 | 9/1966 | Begle | 29—105 |

FOREIGN PATENTS 933,613   8/1963   Great Britain.

HARRISON L. HINSON, *Primary Examiner.*